US 6,536,062 B2

(12) United States Patent
Borza

(10) Patent No.: US 6,536,062 B2
(45) Date of Patent: Mar. 25, 2003

(54) PRODDER WITH FORCE FEEDBACK

(75) Inventor: Michael A. Borza, Ottawa (CA)

(73) Assignee: DEW Engineering and Development Limited, Ontario (CA)

(*) Notice: Subject to any disclaimer, the term of this patent is extended or adjusted under 35 U.S.C. 154(b) by 0 days.

(21) Appl. No.: 10/102,811

(22) Filed: Mar. 22, 2002

(65) Prior Publication Data

US 2002/0124653 A1 Sep. 12, 2002

Related U.S. Application Data

(62) Division of application No. 09/503,491, filed on Feb. 14, 2000, now abandoned.

(30) Foreign Application Priority Data

Dec. 3, 1999 (CA) .............................................. 2291544

(51) Int. Cl.[7] .............................................. G01H 15/00
(52) U.S. Cl. .............................. 13/574; 73/1.86; 73/661; 367/87
(58) Field of Search .......................... 73/574, 629, 644, 73/661, 1.82, 1.86, 862.59, 584; 367/87; 310/334, 336

(56) References Cited

U.S. PATENT DOCUMENTS 5,920,520 A * 7/1999 Gallagher .................... 367/87
6,109,112 A * 8/2000 Borza et al. ................... 73/661

* cited by examiner

Primary Examiner—John E. Chapman
(74) Attorney, Agent, or Firm—Freedman & Associates

(57) ABSTRACT

A detector equipped with force feedback for detecting detonatable devices such as land mines is disclosed. The detector includes a rod having a tip for placing beneath the surface of the ground and for contacting unknown objects. The tip ultrasonically provides an indication of the presence of a metal or plastic material. Means for providing a plurality of ultrasonic signals, each signal of a different frequency, to the unknown object via a single rod is used to compensate the device during use against unknown pressures applied to the rod beneath the surface of the ground.

13 Claims, 8 Drawing Sheets

PRODDER WITH FORCE FEEDBACK

This is a divisional application of U.S. patent application Ser. No. 09/503,491 filed Feb. 14, 2000, now abandoned.

FIELD OF THE INVENTION

This invention relates generally to prodders for probing the ground for buried explosive devices such as landmines and the like, and more particularly to a method and device for providing force feedback to the prodder and/or the user of the device.

BACKGROUND OF THE INVENTION

Despite a variety of mechanized means now available for detecting and clearing landmines, the current hand tool of choice is the hand prodder. Personnel exhibit greater confidence when traversing a minefield which has been hand-prodded by their compatriots than they do with fields cleared by other means.

The traditional hand prodder typically comprises a 30 cm long pointed rod extending from a gripping handle. The probe is generally non-magnetic to avoid setting off magnetically-triggered mines. The user probes the ground ahead and excavates any hard objects which the probe contacts. As the ratio of rocks to landmines in a minefield may number 1000:1, excavation of every contact is labourious, but very necessary.

Currently, instrumented prodders are known having ultrasonic means in the form of an ultrasonic transducer at or near the probe tip that are used for characterization of buried obstructions. These devices can be used in conjuction with a minimum metal content (MMC) detector, wherein the MMC detector first detects the ground indicating the vicinity of a land mine, and, wherein the instrumented prodder is used to probe the earth in the vicinity of the suspected land mine, the location of which may have been isolated using the MMC detector. MMC mine detectors having a search head and circuitry for detecting buried non-metallic and metallic land mines are well known. For example, U.S. Pat. No. 4,016,486 in the name of Pecori as signed to the United States of America by the Secretary of the Army, hereby incorporated by reference, discloses such circuitry.

U.S Pat. No. 5,920,520 to Gallagher, hereby incorporated by reference, discloses an instrumented prodder having a probe in the form of an elongate, preferably non-magnetic rod including a gripping handle disposed at one end. The design of the probe is based partially upon a Split Hopkinson Pressure Bar (SHPB) apparatus. In the apparatus, a compression wave or high frequency elastic mechanical pulse is delivered via a rod to a sample, wherein a portion of the wave is reflected. The incident wave launched at the sample is reflected and/or transmitted from or through the sample, respectively, in dependence upon the characteristics of the material. The effect of mechanical impedance, which is a characteristic of a material, on a SHPB apparatus in three instances is described hereafter:

Firstly and obviously, if the mechanical impedance of a sample under test is the same as that of an incident bar in the SHPB, there will be no reflection as the sample will be displaced in a same manner as the bar itself as the compression wave is delivered. The displacement of the end of the bar is directly proportional to the strain measured ($\epsilon$).

Secondly when the mechanical impedance of a sample is considerably greater than that of the bar, a sample's mechanical impedance tends toward being infinite and substantially the entire wave is reflected.

In a third instance when the mechanical impedance is zero, in the absence of a sample, the reflected wave is tensile but of equal magnitude to the incident wave. The phase of the wave is shifted by $\pi$ and the net stress is zero; the relative displacement at the bar end equals twice that for the first instance ($2\epsilon$).

In a SHPB device, once the relative displacement of the bars is known, the displacement of the sample is ascertained. Taking into account Young's Modulus (E) and the displacement of the bar, the imposed stress can be calculated, wherein the force applied is equal to the product of the stress and the cross-sectional area of the bar.

Since the loading on the sample becomes equal after a short time, the analysis may be somewhat simplified. Strain results may be used for only the incident bar; or alternatively, the striker bar may be directed to impact directly on the sample, and the transmitter bar alone may be used to define the sample characteristics.

It is has been found that plastics, minerals and metals may be discerned from one another by using this approach.

It has been further found that the hand held prodder disclosed by Gallagher having a rod modified to be analogous to the incident bar of a SHPB may be used to detect or discern metal, plastic and rocks.

The prodder rod is provided with one or more piezoelectric transducers capable of generating an acoustic wave into the rod and for detecting reflected waves from an object contacting the end of the rod. Conveniently, signal processing means are coupled to the transducers and are provided for analysing the detected reflected waves for determining the characteristics of the object; more especially, for distinguishing landmines from inert rocks. The signal processor establishes measurements of the frequency-time-amplitude characteristic of the object. The reflected waves are compared with known characteristic signatures of a plurality of materials to attempt to ascertain a match within predetermined limits.

Although U.S. Pat. No. 5,920,520 describes a device that performs satisfactorily in many instances, it suffers from a problem related to the fact that acoustic coupling at the obstruction is a function of the force applied to the probe end. As a result, the results are often erroneous. This is particularly detrimental when the prodder indicates that the obstruction is a rock, when in fact it is a land mine.

Preferably, enough force will be applied to the probe end such that characterisation of the obstruction can occur without causing detonation; and, preferably, a relatively consistent force will be applied to the probe end such that an accurate determination as to the character of the buried obstruction can be made. However if too little force is applied at the probe end, a poor reading may result and a mine in the vicinity of the probe may go undetected. Too much force applied at the probe end in the vicinity of a land mine may inadvertently detonate the mine.

In prior art FIG. 1 a specimen sample is shown juxtaposed between an incident bar and a transmitter bar. A strain gauge disposed on each bar provides a signal-to-signal processor as is described heretofore.

In prior art FIG. 2 a hand-held prodder for probing the ground for buried explosive devices such as landmines and the like is provided. The prodder comprises a rod 2 having a first end 3 flexibly supported by an annular rubber coupling 4 in a mounting nub 5. The nub 5 is screwed into a handle 6. The rod has a pointed second end 7 for sensing objects 8 buried in the ground 9.

The rod 2 is 45 cm long and is formed of non-magnetic, austenitic stainless steel. Only 30 cm project from the rubber coupling 4. The rubber coupling 4 lessens the rigidity between the rod 2 and handle 6.

Best seen in prior art FIG. 3, a piezoelectric crystal 10 is glued to the first, or driver end 3 of the rod 2. When an electric field is applied to the crystal 10, a mechanical strain will occur and drive mechanical energy into the rod's driver end 3. Conversely, when the crystal 10 is mechanically stressed, an electric charge is produced. A suitable crystal is a 15 mm long, 6.35 mm diameter poly-crystalline ceramic cylinder, model Sonex P-41 available from Hoechst CeramTec, Mansfield, Mass. The crystal 10 is electrically insulated from the rod 2 with a ceramic insulator 11. Optionally, the insulator further serves to provide mechanical strength to the joint between the crystal and the rod.

Positive and negative electrical leads 12 from the crystal pass through the nub 5 for bidirectional electrical signal transmission between the crystal 10 and an electronics module 13. Shown in FIG. 2, the module 13 is installed within the prodder's handle and is powered with 9 V batteries 14.

The electronics module 13 is capable of two modes: a driver mode and a signal processing mode. In the driver mode, an electrical signal is transmitted along leads 12 to the crystal 10 for generating a piezoelectric mechanical pulse. The pulse is introduced into the rod's driver end 12. In the signal processing mode, any electrical signals generated by the crystal 10 are transmitted along leads 12 for processing by the electronics module 13.

More specifically, the module 13 comprises a digital signal processing microcomputer 15, an EPROM 16 containing program instructions and digital storage means, an A/D converter 17, a signal input amplifier 18 and a driver output amplifier 19. An audio/visual binary output device 20 is provided.

A suitable signal processor is a model ADSP-2181 digital signal processing microcomputer by Analog Devices, Inc., Norwood, Mass. The ADSP-2181 contains a high speed serial port, 16 bit data processing capabilities and has both onboard program RAM and data memory RAM. For permitting battery powered operation, the ADSP-2181 features a power saving "sleep" mode. After downloading of program instructions from the EPROM, the ADSP-2181 will reduce its power consumption and await a suitable trigger before "waking-up" to begin signal processing.

Having reference to the prior art flow chart in FIG. 4, when the prodder is activated, the EPROM 16 downloads the analysis program to the ADSP-2181 processor 15 and awaits a trigger. When triggered (i.e., contact of the rod's sensing end with an object) the EPROM 16 signals the driver output amplifier 19 to generate an ultrasonic analog driver signal (20–200 kHz). The driver signal stimulates the crystal 10 to generate a mechanical pulse and send it as an acoustic incident wave down the longitudinal axis of the rod 2. The incident wave reflects from the object 8 at the rod's sensing end 7 and returns to the rod's driver end 3 as a reflected wave. The mechanical energy in the reflected wave stimulates the crystal 10 to generate electrical analog signals characteristic of the reflected wave.

The analog signals are processed through the signal input amplifier 18 and converted by the A/D converter 17 for analysis by the signal processor 15. A suitable A/D converter is available as model AD876 10 bit, 20 MSPS (million samples per second) CMOS converter, also from Analog Devices, Inc. The AD876 is also capable of a "sleep" mode.

The digital processor 15 stores the reflected data in its RAM memory. The characteristics of the reflected signal are dependent upon the material characteristics of the object 8. Different materials have different mechanical impedance (MI) and frequency-dependent damping coefficients. Analysis of the reflections and damping rates demonstrated in the reflected data is instructive of the material characteristics of the object.

Accordingly, using one analytical technique, the stored data is conditioned using a stepping FFT and analysed for frequency-time-amplitude information. A 256 point FFT from a 1024 sample is advanced in 128 sample steps which yields 7 time-slices of FF transformed data. The characteristics distinctive of the material are generally located within the first 5–10 harmonics or bins of the transformed data.

The effects of the peculiar characteristics of the rod are calibrated by causing the piezoelectric crystal to send a pulse along the rod when its sensing end is not contacting anything. This "dryfire" provides a baseline reading which accounts for individual characteristics including the tapered point of the bar, wear, temperature, and accumulated debris. This resulting baseline power data is subtracted from the actual contact data.

Non-contact calibration can be done before each use to account for physical prodder variations. The extraction of the baseline rod characteristics heightens the sensitivity of the signal analysis, having removed a portion of the signal which is not attributable to the object.

However, non-contact calibration does not account for variations in pressure with which the sensing end 7 of the rod is forced against the object 8 to be detected. In fact, there is no attempt to calibrate the prodder with respect to effects from an applied force, such as pressure. This is a significant limitation to the prodder described heretofore and shown in the figures. Since readings acquired with the prodder are dependent upon applied pressure, and since the applied pressure is likely different each time the prodder is used, it is desirable to provide means for providing force feedback to compensate the readings for an applied force. Providing force feedback to the prodder and/or the user of the prodder also allows the applied force to be determined to calculate whether too little or too much force is applied to the object being detected. Preferably, the means for providing force feedback does not reduce the durability of the prodder and/or significantly increase the manufacturing cost.

Mechanical force sensors such as springs suffer from several disadvantages. Firstly, they are subject to fatigue over time. Secondly, they are often difficult to design such that they are robust enough and accurate enough for military applications without incurring significant costs. These drawbacks are well known and overcoming them would be advantageous.

It is therefore an object of the invention to provide a method and device, which will overcome the aforementioned problems, related to too much force, too little force, or a varying force being applied to the probe end while in use.

It is a further object of the invention to provide an instrumented prodder for detection of land mines and the like that includes force feedback for sensing a force, such as pressure, applied to an end thereof.

It is another object of the invention to provide an instrumented prodder for detection of land mines and the like, that provides data related to characteristics of the probed object that are independent from the force of the prodder on the object.

It is a further object of the invention to provide a handheld prodder for probing the ground for buried explosive devices such as landmines and the like, that is relatively simple, rugged, and inexpensive.

SUMMARY OF THE INVENTION

In accordance with the invention there is provided a prodder having force feedback for detecting detonatable devices or land mines, comprising:
 a rod having an end for placing in contact with a first object to be detected;
 a first transducer coupled to the rod for providing an acoustic wave to the first object and for receiving acoustic waves reflected from about the first object;
 a second rod having an end for placing in contact with a reference object;
 a second transducer coupled to the second rod for providing an acoustic wave to the reference object and for receiving acoustic waves reflected from about the second object; and,
 an electronics module for analysing data related to the waves reflected from the reference object to determine a value related to the force applied to the first rod, for analysing data related to the waves reflected from the first object in dependence upon the determined value to determine acoustic characteristics of the first object material so as to categorize the first object's material in a force independent fashion.

In accordance with another embodiment of the invention there is provided a land mine detector having force feedback comprising:
 a rod having a sensing end for contacting objects buried beneath the ground;
 a transducer coupled to a non-sensing end of the rod for imparting mechanical energy into the rod towards the sensing end in contact with a buried object, and for detecting a signal corresponding to reflected waves from the buried object, the signal containing information related to a force exerted on the rod and to material characteristics of the buried object;
 a second transducer coupled to an end of a second rod for imparting mechanical energy into the second rod towards another end in contact with an object having known characteristics, and for detecting a signal corresponding to reflected waves from the second object, the signal containing information related to the force exerted on the rod and to material characteristics of the known object; and,
 means for processing the signals, for determining at least one of the force exerted on the rod, and force-independent material characteristics of the buried object for comparing with stored material characteristics of known objects so as to categorize the object's material.

In accordance with yet another embodiment of the invention there is provided a prodder having force feedback for detecting detonatable devices or land mines, comprising:
 a rod having an end for placing in contact with a first object to be detected;
 a first transducer coupled to the rod for providing a first acoustic wave to the first object and for receiving first acoustic waves reflected from about the first object and for providing a second acoustic wave to the first object and for receiving second acoustic waves reflected from about the first object; and,
 an electronics module for analysing data related to the first and second acoustic waves reflected from the first object to determine acoustic characteristics of the first object material so as to categorize the first object's material in a force independent fashion.

BRIEF DESCRIPTION OF THE DRAWINGS

Exemplary embodiments of the invention will now be described in conjunction with the drawings, in which.

DETAILED DESCRIPTION

Figure 1:
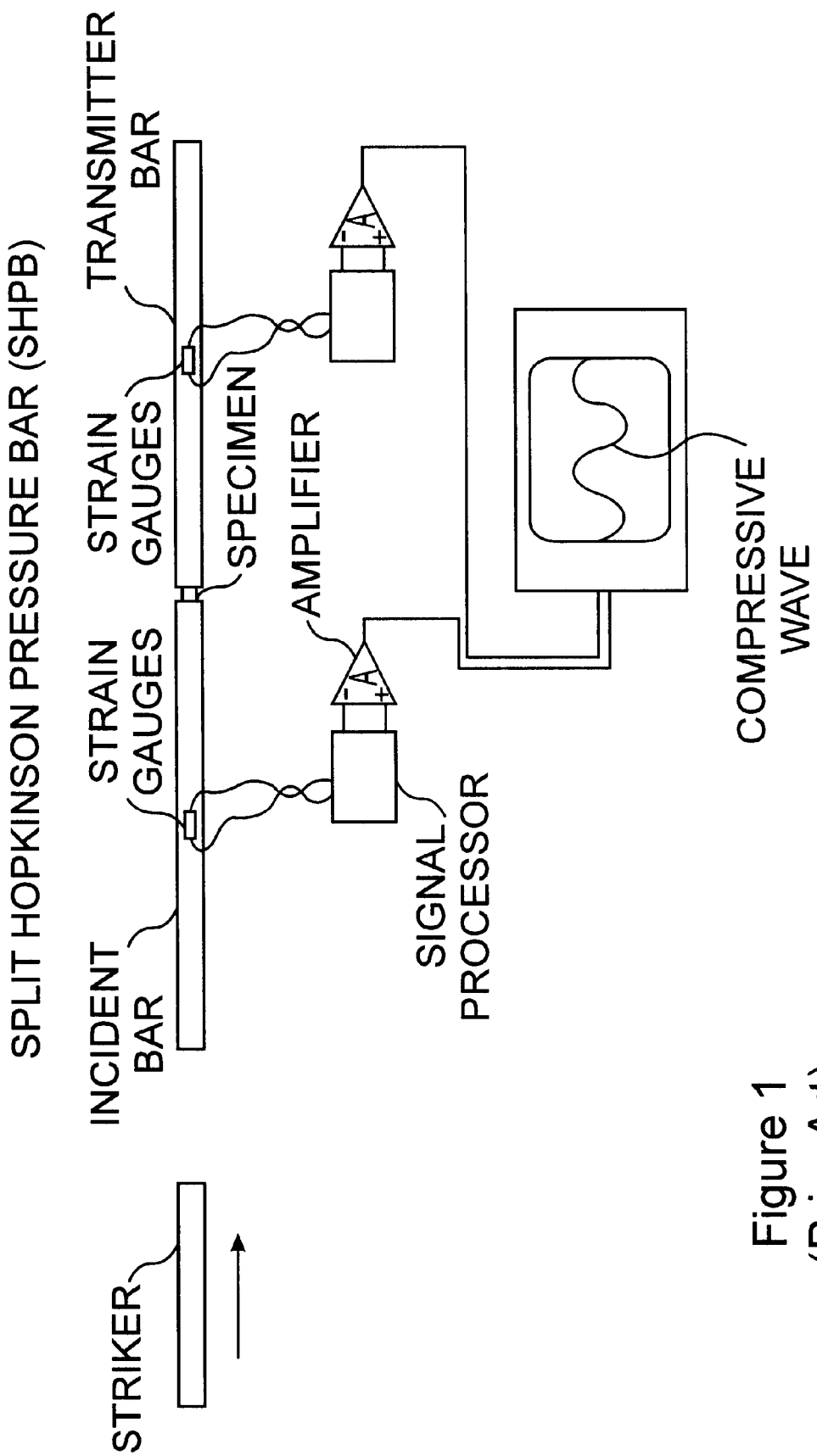
FIG. 1 is a prior art circuit diagram of a Split Hopkinson Pressure Bar device.
Figure 2:
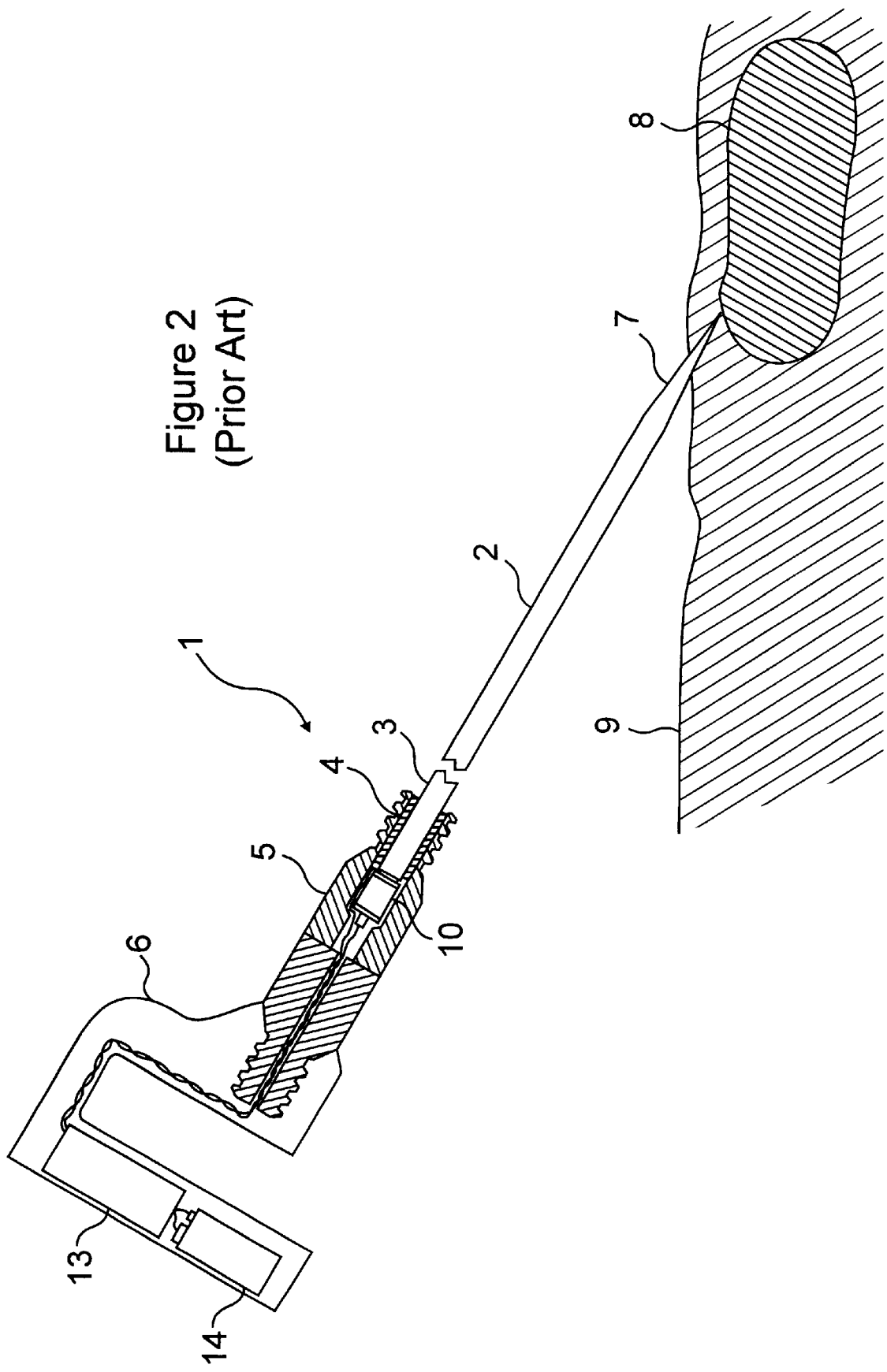
FIG. 2 is a prior art cross-sectional view of a hand prodder contacting a sub-surface object.
Figure 3:
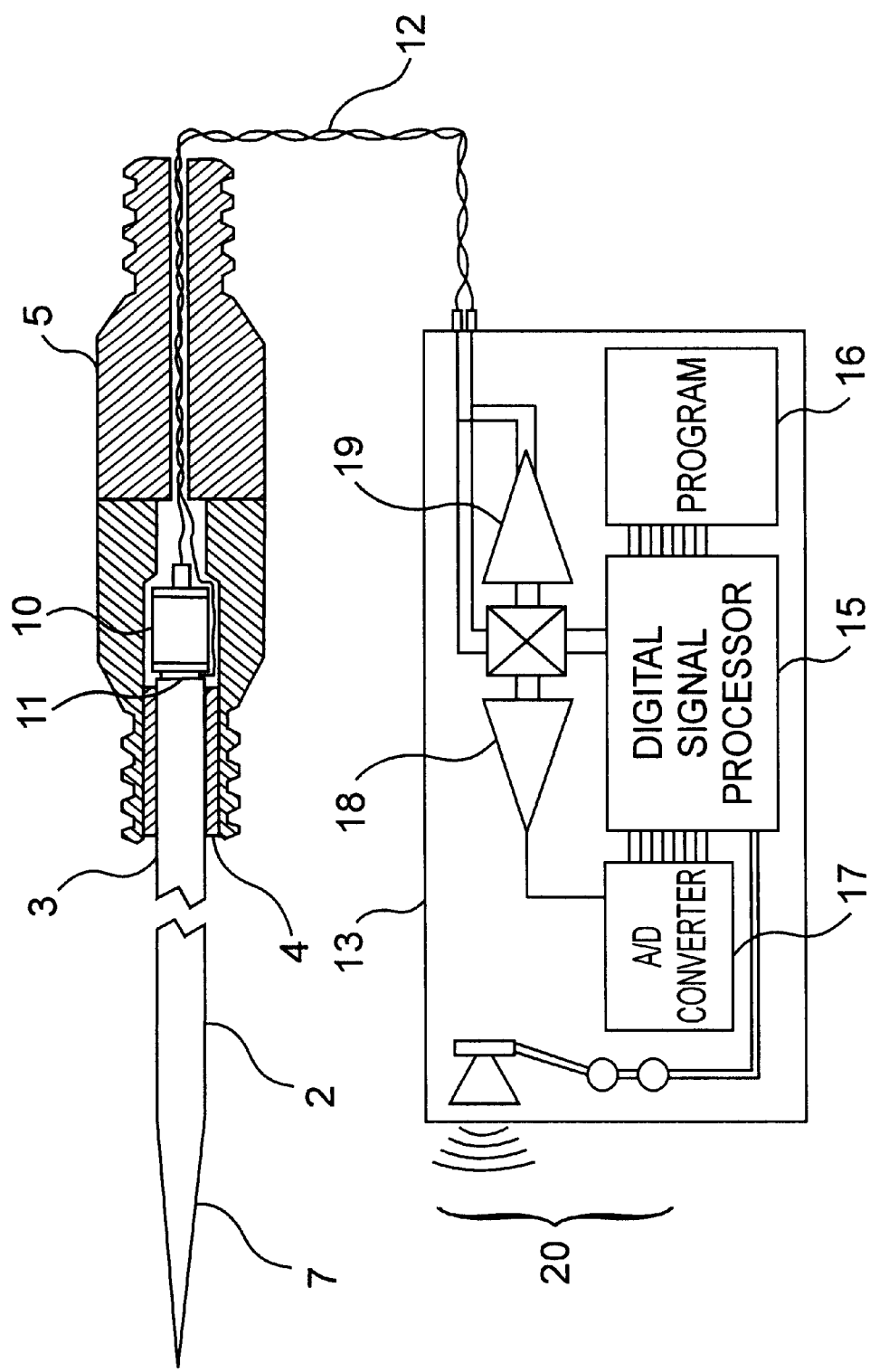
FIG. 3 is a prior art cross-sectional view of the rod and piezoelectric crystal portion of the prodder coupled to the signal processing module.
Figure 4:
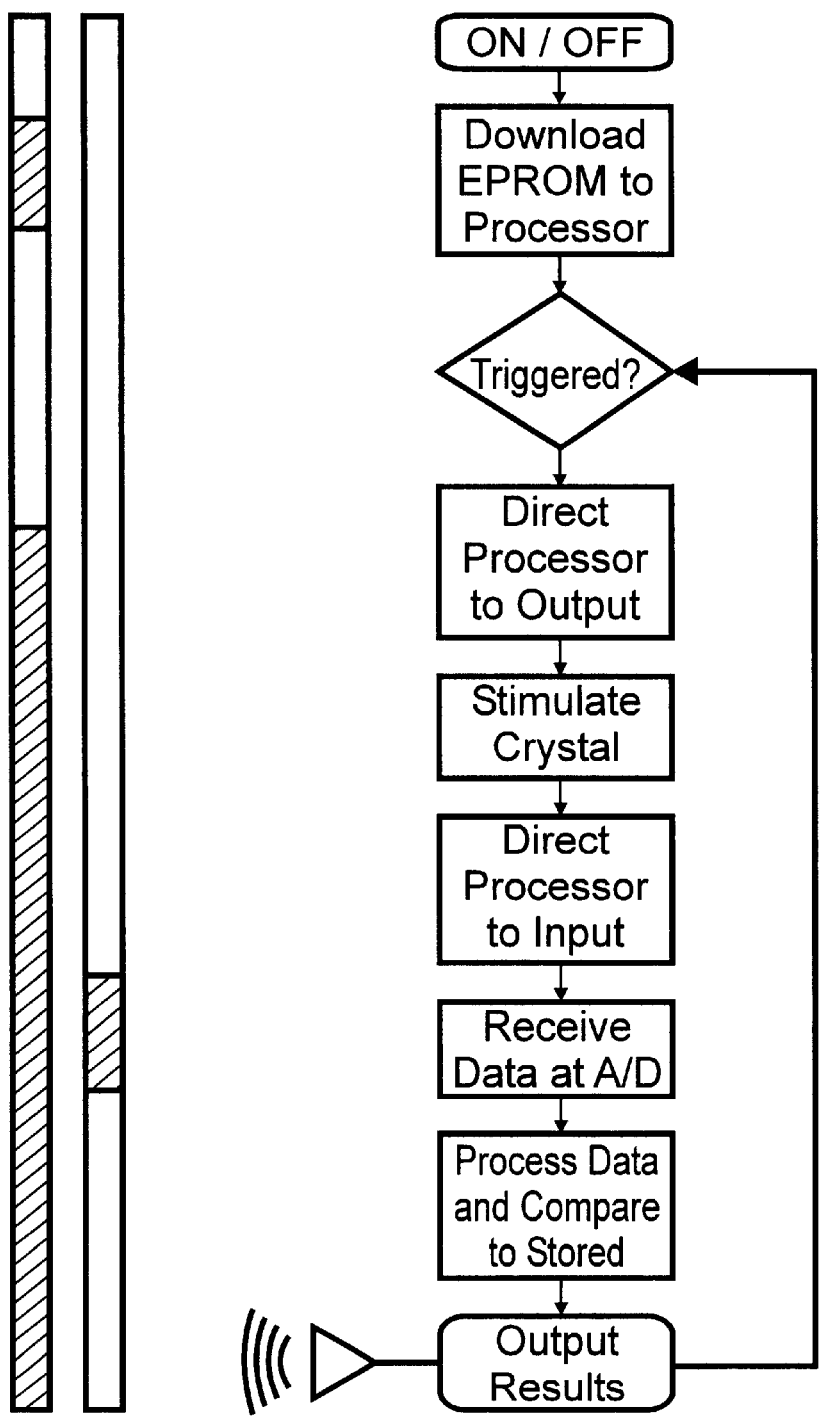
FIG. 4 is a prior art flow chart of the digital signal processor and A/D functions.
Figure 5:
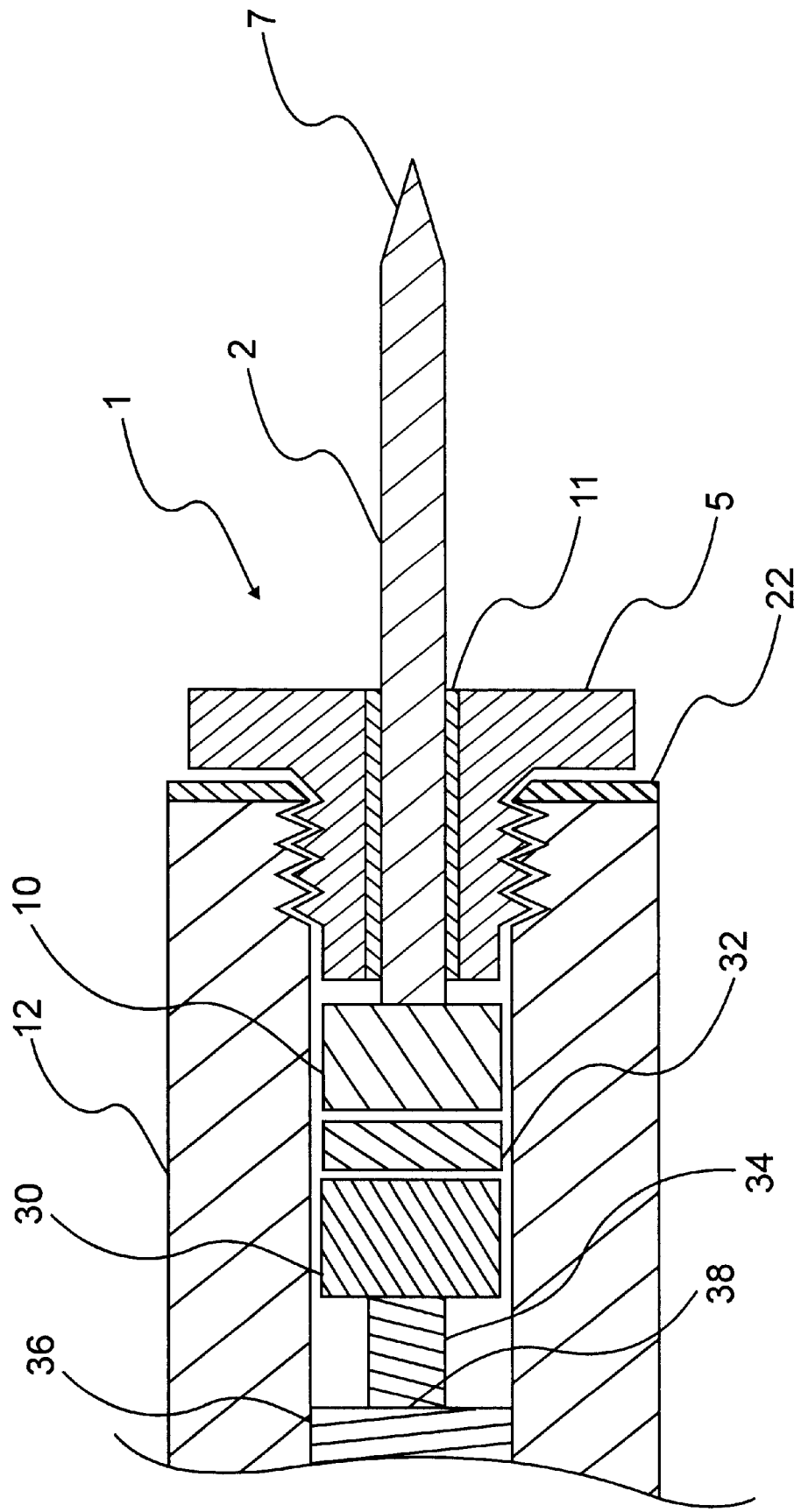
FIG. 5 is a cross-sectional view of the rod and piezoelectric crystal portion of the prodder with force feedback.

Referring now to FIG. 5, an embodiment of a prodder having force feedback is shown. The device and method for providing force feedback are comparable to the device and method described heretofore. The prodder includes a probing rod 2, a housing 12 for receiving a non-probing end of the rod 2, and a threaded lock fitting screw 5 having a bore extending through its shaft for slidably receiving the rod 2 and for securing the rod 2 within the housing 12. A spacer in the form of a compressible washer 22 is disposed between an inside face of a flange of the threaded probe mount 5 and an outside face of the housing 12. Compression fitting 4 electrically insulates the non-prodding end of the rod, which is coupled to a first transducer 10.

The 'force sensing' section of the prodder 1 includes a second transducer 30 linearly coupled to the first transducer 10. The first 10 and second 30 transducers are separated by an acoustic insulator 32. A second rod 34 couples the second transducer 30 to a known object 36. First transducer 10, second transducer 30, and known object 36 are configured so that when the prodding end 7 is forced against an obstruction, each experiences an equivalent force applied thereto. The prodder also includes an electronics module 13 disposed in a prodder handle 6 for controlling the ultrasonic transducers, for analysing the acquired signals, and for determining material characteristics of the object independent of the applied force to the object.

In operation, the prodder 1 in accordance with the invention, works in the following manner: The prodder rod 2 is inserted into the ground 9 until it comes into contact with an object 8. The force exerted by the user to push the rod 2 into contact with the object is met with an approximately equal but opposite force of the rock 8 on the rod's sensing end 7, provided the rock 8 does not substantially move. This force is relayed to the components of the prodder that are linearly coupled to the rod 2 and the object 8. For example, if the force applied to the rod's sensing end 7 is directed towards the driving end 3 of the rod, then it will be relayed through the intermediate and linearly arranged components in a manner such that the known object experiences an equivalent force applied thereto. Alternatively, depending upon the construction of the probe, the force experienced by the known object is proportional to the applied force.

The electronics module induces the first 10 and second 30 transducers to launch approximately simultaneously ultrasonic pulses towards the prodding end 7 and the non-prodding end 38, respectively. An ultrasonic pulse from the first transducer 10 travels through the rod 2 to the unknown object 8 in contact with the sensing end of the rod 7 and is reflected back to the first transducer 10, where it is converted to electrical signals indicative of rod 2 and the environment about rod 2. For example, the electrical signals are typically related to both the material characteristics of the unknown object being detected and the force applied to the probing end of the rod 7.

The ultrasonic pulse generated by the second transducer 30 travels through a second rod 34 to a known object 36 in contact with the second rod 34, and is reflected back to the second transducer 10, where it is converted to electrical signals indicative of rod 34 and the environment about rod 34. These electrical signals are typically related to both the material characteristics of the known object 36 and the force with which the prodder is forced against the object 8. Since the environment and material characteristics about the known object 36 are known and relatively constant, variations in reflected data returning to transducer 30 are mostly dependent on variations with the applied force.

The electronics module 13 processes, stores, and analyses the reflected data from the first 10 and second 30 transducers, as described above. In particular, the reflected data received at the second transducer 30 is used to compensate the reflected data received at the first transducer 10. For example, the reflected wave returning to the second transducer 30 is converted into a corresponding electrical signal related to the applied pressure and is subtracted from a signal corresponding to the reflected wave returning to the first transducer 10 related to the applied pressure and the material characteristics of the unknown object 8, so as to produce a signal representing substantially the material characteristics of the unknown object. In effect, the desired results are extracted or deconvoluted from the pressure-dependent readings. The resulting compensated data provides a pressure-independent reading, i.e., the reading that would be acquired if there was no force applied to the prodding end of the rod 7. The compensated data is used to categorise broadly the unknown object as plastic, rock or metal. The user is presented with a visual indication, preferably in the form of a light pattern indicating the type of obstruction.

This method of determining the characteristics of and classifying the unknown object is more accurate than methods not accounting for variations in applied force. Since the transducer 10 used in determining the characteristics of the unknown object and the transducer 30 used as a 'force sensor' are similar or identical, they also have or experience similar temperature dependencies, wear due to material fatigue, durability, and/or variations in external environment. Moreover, since the force sensor is constructed generally from the same materials used in constructing the prior art device, the prodder with force feedback is constructed with minimal additional costs.

The force applied to the rod 2 is easily calculated to provide an indication of the applied force to the user and/or the prodder. In addition to providing means for compensating the reflected data for variations in applied force, the magnitude of the applied force provides the user with information regarding the pressure they are applying to the unknown object. The latter is of particular importance when the user needs to apply a force that is high enough to provide a reliable reading, but not high enough to accidentally detonate a landmine. In one embodiment, a signal indicative of the applied force is used to sound an alarm when too much or too little force is applied. Alternatively, the intensity of the alarm increases and/or decreases, dependent upon the amount of force applied. In another embodiment, a visual indication of the applied force is provided, i.e., in the form of a plurality of LEDs or similar indicators.

As described in the prior art, the rod is preferably formed from a non-magnetic, austenitic stainless steel and the transducer is an appropriate piezoelectric crystal. The known object 36 is constructed from a material, such as an appropriate plastic or metal, with unique material characteristics. Rod 34 is constructed from the same material used to construct rod 2, or some other acoustically conductive material. Optionally, the rod 34 is tapered at the end contacting the known object 36. Alternatively, transducer 30 is directly coupled to known object 36 in the absence of rod 34.

Figure 6:
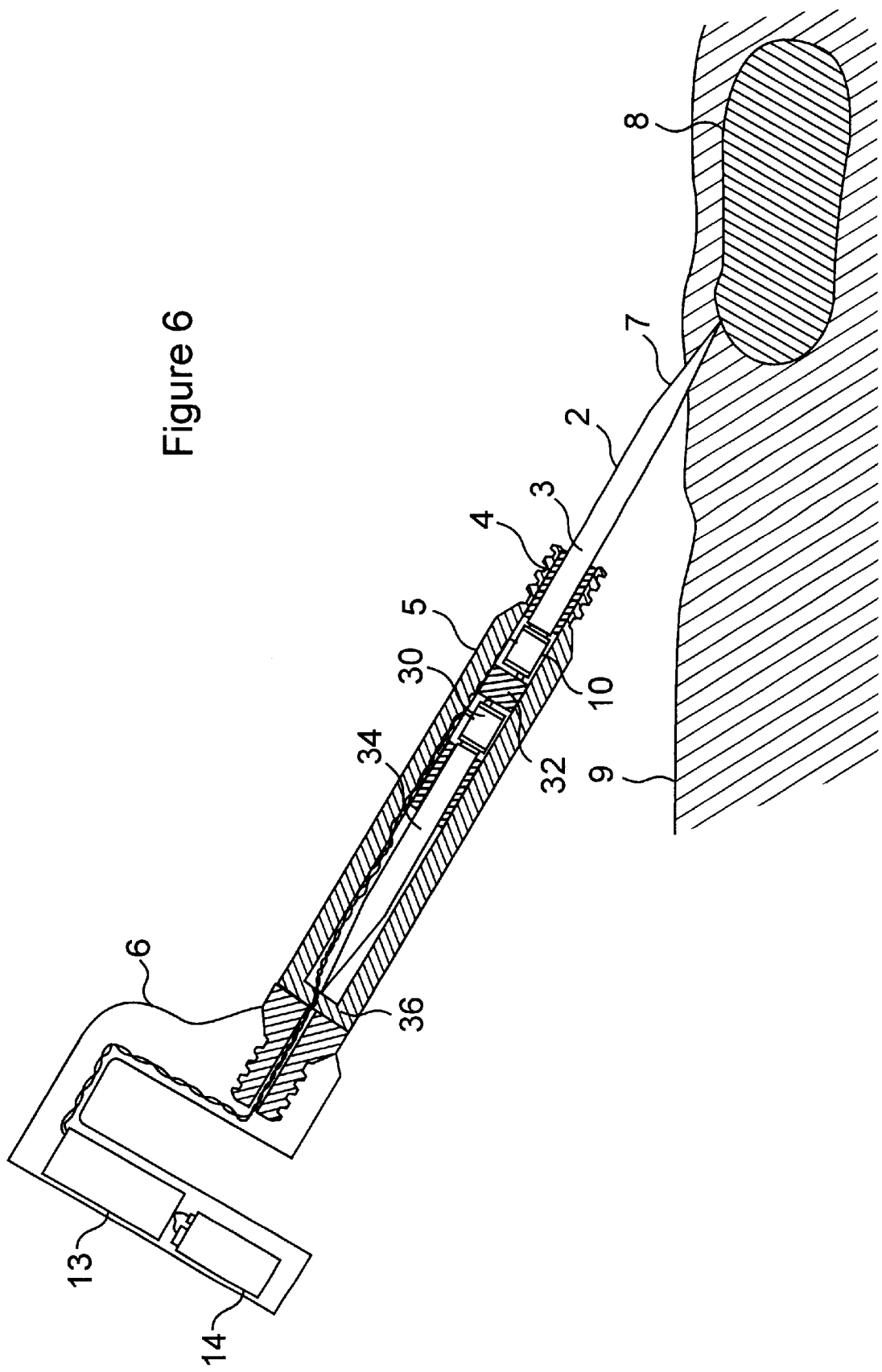
FIG. 6 is an exploded perspective view of the prodder components disposed within a sleeve.

In another embodiment, shown in FIG. 6, the rod 2 coupled to the first transducer 10 is the same shape and size as the rod 34 coupled to the second transducer 30. This has the advantage that the reflected signals correspond to data acquired at approximately the same time, and is perhaps more accurate.

The acoustic insulator 32 is constructed preferably of a material, such as an appropriate rubber, that shields the second transducer 30 from the acoustic waves originating from transducer 10, but allows the force applied to the sensing end 7 of the rod to be relayed to the force sensing components. In some instances a degree of torque will also be compensated for.

The acoustic pulses generated in the first 10 and second 30 transducers generally have the same pulse duration and frequency. However, in some circumstances it is advantageous for the pulse duration and/or pulse frequencies to differ. For example, if the acoustic insulator does not effectively block the acoustic waves in the prodding section of the probe from the components in the force-sensing section of the probe, these differences can be used to filter out the desired material characteristics of the unknown object.

Figure 7:
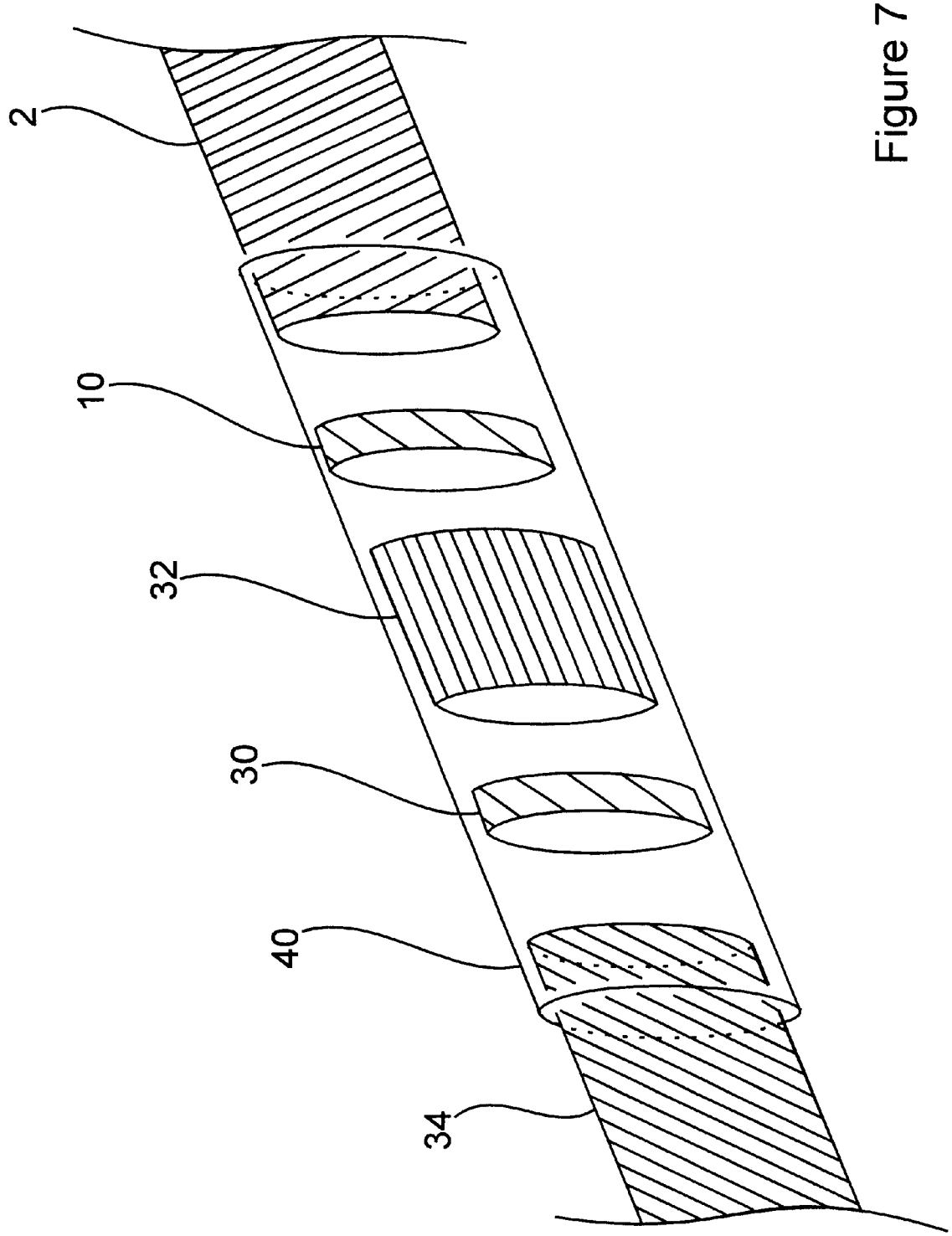
FIG. 7 is a cross-sectional view of the hand prodder contacting a sub-surface object, according to an embodiment of the invention; and, FIG. 8 is a cross-sectional view of a multi-frequency ceramic acoustic transducer.

In order for the acoustic waves to be transmitted without distortion, the coupling between components, such as the transducer and the rod, must be free of imperfections such as interruptions (air pockets) or resonance impeding contacts (such as screws or welds) that dampen the transmission. There are various means, such as an appropriate adhesive, of securing each of the rods to the corresponding transducer. In one embodiment, shown in FIG. 7, the acoustic insulator 32 serves as a barrier between transducers within a pliant, yet stable, sleeve 40. The sleeve also maintains longitudinal alignment between the components, i.e., the rods, the transducers, and the known object 36.

As described in the prior art, the effects of the peculiar characteristics of the prodder are easily accounted for by producing a "dryfire", which provides a baseline reading that accounts for individual characteristics including the shape, length, temperature, and condition of the rods 2 and 34, the transducers 10 and 30, and any intermediate components or adhesives. The resulting baseline data is subtracted from the pressure-compensated contact data.

There are many advantages of the device as described heretofore, as compared to other devices with force feedback. One of the most significant advantages is the low cost of the device. Since the transducers serve as both the probing means and the force sensing means, no extra parts are needed. The limited number of parts makes the device very simple and economical to manufacture. The fact that the force sensing components are disposed within the prodder, makes the prodder more rugged, durable, and compact.

Additional cost considerations are recognized since the probing and force sensing means wear along the same time scale, and thus do not need to be replaced at different times. Furthermore, since additional components are not necessary, the range of the prodder is not limited to specialized parts. For example, the thermal sensitivity is limited primarily by the transducers.

Other advantages relate to the unique arrangement of the transducers. Since the first and second transducers are linearly arranged, the force applied to the tip 7 of the probe is equally conveyed to the first 10 and second 30 transducers, and to the known object 36. Accordingly, the effect of the applied force is easily factored out from the acoustic waves reflected from the unknown object 8. Since the first 10 and second 30 transducers are simultaneously energized, the wave reflected from the known object 36 can be used as a baseline reading to provide a more accurate characterisation of the unknown object 8. For example, in addition to variations in applied force, variations in temperature, wear, and battery power are accounted and automatically compensated for.

In its broadest embodiment, the invention relies on at least two data sets to provide independent correlations between applied force and material characteristics. The resulting correlations can then be used to determine a solution. As described above, when applied force and a first object material characteristics are unknown and a second object material characteristics are known, the applied force is solved based on the second object and used to compensate for the material characteristic determination for the first object. This is straightforward.

Though it is less easily envisioned, when the resulting system has two variables and two independent equations, the system is also solvable. Thus if applied force is a same value in each data set and object material is known to be identical, then the only issue remaining is equation independence. As long as two methods of determining the force and material characteristics are used that are independent, the resulting equations are solvable.

In an alternative embodiment, two probing rods are used each coupled to a transducer. Optionally, four data sets are captured—one with the first rods transmitted accoustic signal and another with the second rods transmitted acoustic signal. Alternatively, the second rod only has a receiver for receiving an acoustic signal transmitted along the first rod. Further alternatively, each transducer is operated independently to provide two data sets.

It is highly advantageous that a same electronics module is used for processing signals associated with each received acoustic signal. Typically, the module consists of a single processor for analysing each received acoustic signal. Thus, additional costs are not incurred in implementing the processing for both rods.

It is also possible to probe with multiple frequencies using a same rod. This is particularly useful when material signatures vary over a frequency range. For example, thin metal housings are difficult to identify. High frequency probing is useful for distinguishing thin metal samples which are difficult to identify with lower frequencies. Unfortunately, these same high frequencies are not the most suitable frequencies for operation with the present invention. As such, the use of a first near optimal frequency followed by a higher frequency signal allows for identification of thin samples more accurately.

Figure 8:
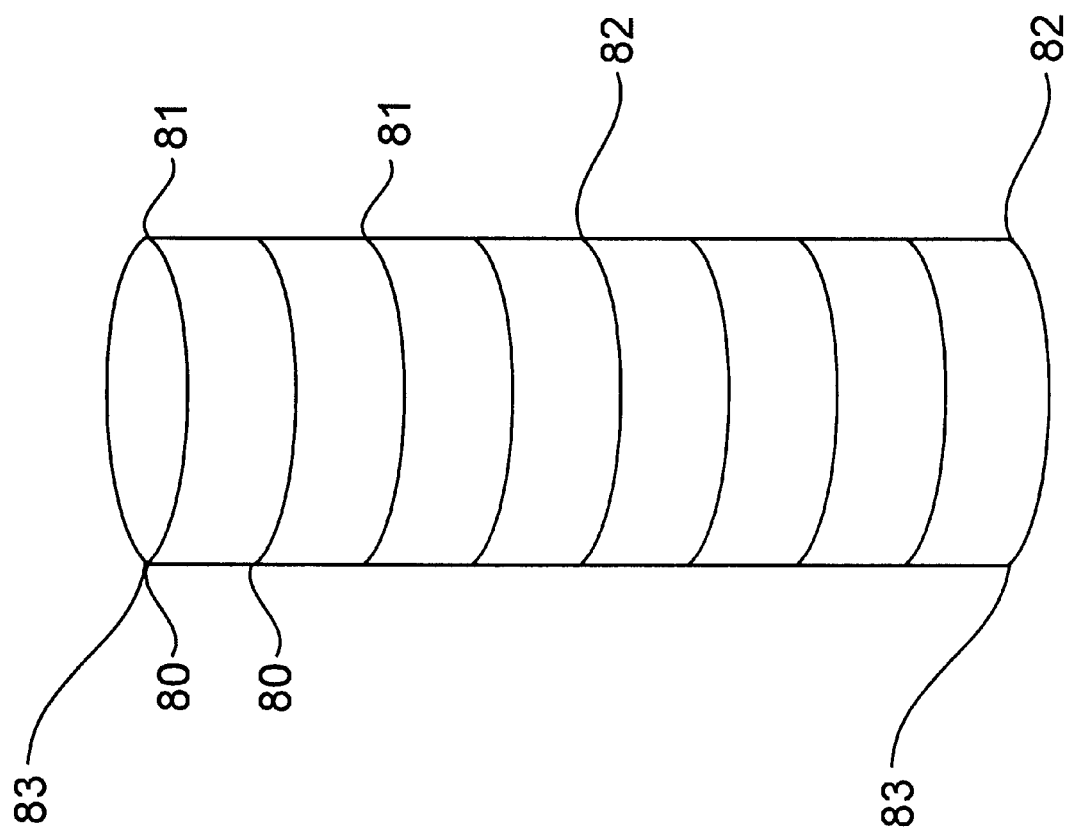

In order to probe with two or more frequencies using a single rod, a multi-frequency transducer is described with reference to FIG. 8. A ceramic acoustic transducer in the form of a piezoelectric transducer is shown. The transducer is formed of several sections shown here as equal in size. This need not be so and is only presented as such for easier understanding thereof. A set of leads 80 is provided across the first segment. Providing power across these leads will cause the transducer to oscillate at a first frequency. Across the first two segments are another pair of leads 81. Typically, the pair of leads 80 and the pair of leads 81 will have one common lead. Providing power across the leads 81 will cause the transducer to oscillate at a second other frequency. Similarly, leads 82 and 83 are used for a third and fourth frequency, respectively.

Since a length of the excited transducer portion affects frequency, the result is a variable frequency oscillator. This is efficient and therefore desirable. The variable frequency oscillator allows use of a fundamental frequency and its harmonics. Also, the transducer segments can be excited in parallel. A single segment could be excited 8 times in parallel providing increased acoustic signal strength.

The transducer segments may be non-identical as indicated above. This would allow for a binary type arrangement having three segments 1, 2, 4 arranged in the following order (2)(1)(4)providing any of 1, 2, 3, 4, 5, and 7 segment oscillators. Of course, other geometric methods of varying transducer frequency are also useful with the present invention.

Of course, numerous other embodiments may be envisaged, without departing from the spirit and scope of the invention. For example, the first and second transducers may be replaced with a plurality of transducers. In this case, the plurality of transducers are supported in a manner that allows the applied force to be equally experienced as in the general embodiment.

What is claimed is:

1. A prodder having force feedback for detecting detonatable devices or land mines, comprising:

a reference object;

a first rod having an end for placing in contact with a first object to be detected;

a first transducer coupled to the first rod for providing an acoustic wave to the first object and for receiving acoustic waves reflected from about the first object;

a second rod having an end for placing in contact with the reference object;

a second transducer coupled to the second rod for providing an acoustic wave to the reference object and for receiving acoustic waves reflected from about the reference object; and, an electronics module for analysing data related to the acoustic waves reflected from the reference object to determine a value related to the force applied to the first rod, for analysing data related to the acoustic waves reflected from the first object in dependence upon the determined value to determine acoustic characteristics of the first object material so as to categorize the first object's material in a force independent fashion.

2. A prodder as defined in claim 1, wherein the first transducer, the second transducer, and the reference object are arranged co-linearly.

3. A prodder as defined in claim 2, wherein the first transducer and the second transducer are piezoelectric crystals spatially separated by an acoustically insulating material.

4. A land mine detector having force feedback comprising:
- a second object with known characteristics;
- a first rod having a sensing end for contacting objects buried beneath the ground;
- a second rod having a sensing end contacting the second object with known characteristics;
- a first transducer coupled to a non-sensing end of the first rod for imparting mechanical energy into the first rod towards the sensing end of the first rod in contact with a buried object, and for detecting a signal corresponding to reflected waves from the buried object, the signal containing information related to a force exerted on the first rod and to material characteristics of the buried object;
- a second transducer coupled to an end of the second rod for imparting mechanical energy into the second rod towards the sensing end of the second rod in contact with the second object having known characteristics, and for detecting a signal corresponding to reflected waves from the second object, the signal containing information related to the force exerted on the first rod and to material characteristics of the second object; and,
- means for processing the signals, for determining at least one of the force exerted on the first rod, and force-independent material characteristics of the buried object for comparing with stored material characteristics of known objects so as to categorize the object's material.

5. A land mine detector as defined in claim 4 wherein the means for processing the signals comprises means for determining both the force exerted on the first rod and force-independent material characteristics of the buried object for comparing with stored material characteristics of known objects so as to categorize the buried object's material.

6. A land mine detector as defined in claim 4, wherein the first rod is non-magnetic, and wherein the land mine detector includes an indicator for indicating to a user when excessive force is being applied to the first rod.

7. A land mine detector as defined in claim 6, wherein the indicator is a visual indicator.

8. A land mine detector as defined in claim 6, wherein the indicator is an audio indicator.

9. A land mine detector as defined in claim 4, wherein the force is pressure.

10. A land mine detector as defined in claim 4, wherein the transducers are piezoelectric crystals.

11. A land mine detector as defined in claim 9, wherein the second object having known characteristics and the second transducer are disposed within the prodder in a manner such that, during use, each experiences a force equivalent to the force with which the first rod is applied to the buried object.

12. A force feedback device as defined in claim 11, wherein the buried object, the first rod, the first transducer, the second rod, the second transducer, and the second object with known charateristics are disposed linearly.

13. A force feedback device as defined in claim 4, wherein the electronics module consists of a single processor.

\* \* \* \* \*